United States Patent [19]

Yamamura

[11] Patent Number: 4,489,759
[45] Date of Patent: Dec. 25, 1984

[54] FOLDING HOSE

[75] Inventor: Michio Yamamura, Amagasaki, Japan

[73] Assignee: Tigers Polymer Corporation, Taketsuki, Japan

[21] Appl. No.: 186,023

[22] PCT Filed: Apr. 23, 1979

[86] PCT No.: PCT/JP79/00102

§ 371 Date: Jan. 2, 1980

§ 102(e) Date: Oct. 15, 1979

[87] PCT Pub. No.: WO79/01016

PCT Pub. Date: Nov. 29, 1979

[30] Foreign Application Priority Data

May 2, 1978 [JP] Japan .................................. 53-59940
May 25, 1978 [JP] Japan .................................. 53-71505
Jul. 10, 1978 [JP] Japan .................................. 53-95414

[51] Int. Cl.³ .................................................... F16L 11/00
[52] U.S. Cl. ...................................... 138/122; 138/129; 138/131; 138/154; 138/DIG. 8
[58] Field of Search ............... 138/121, 122, 173, 129, 138/118, 131, 154, DIG. 8

[56] References Cited

U.S. PATENT DOCUMENTS 3,157,543 11/1964 Roberts et al. ................. 138/122 X
3,323,553 6/1967 Richitelli et al. .................. 138/122
3,889,716 6/1975 Linhart ............................... 138/131

FOREIGN PATENT DOCUMENTS 2201421 4/1974 France ............................... 138/121
43-23840 10/1968 Japan .
45-14745 5/1970 Japan .
47-27164 7/1972 Japan .
1019885 2/1966 United Kingdom ............... 138/121
1448472 9/1976 United Kingdom ............... 138/121

Primary Examiner—James E. Bryant, III
Attorney, Agent, or Firm—Griffin, Branigan & Butler

[57] ABSTRACT

A folding, bellows type, hose of synthetic resin includes a coil to from the chevrons thereof. The modulus of elasticity in bending of the synthetic resin hose wall is in the range of from 2.500 to 14.00 Kg/cm. The oblique portions of the hose wall is attached to the coil on one side thereof near a valley, and on the other side thereof near the crest of the chevron, throughout the whole length of hose.

5 Claims, 7 Drawing Figures

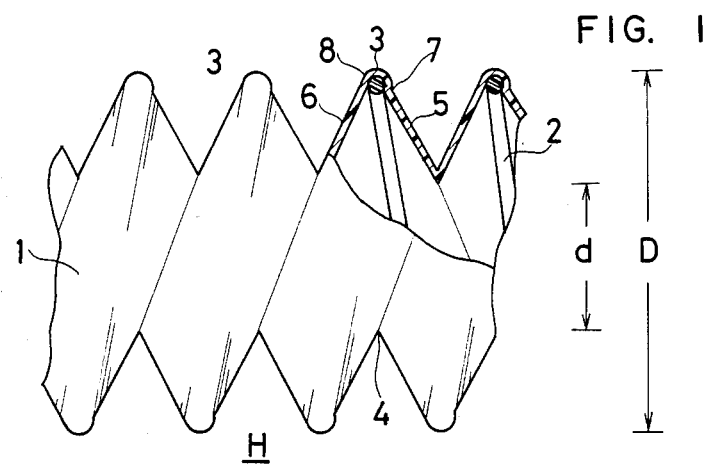
FIG. 1
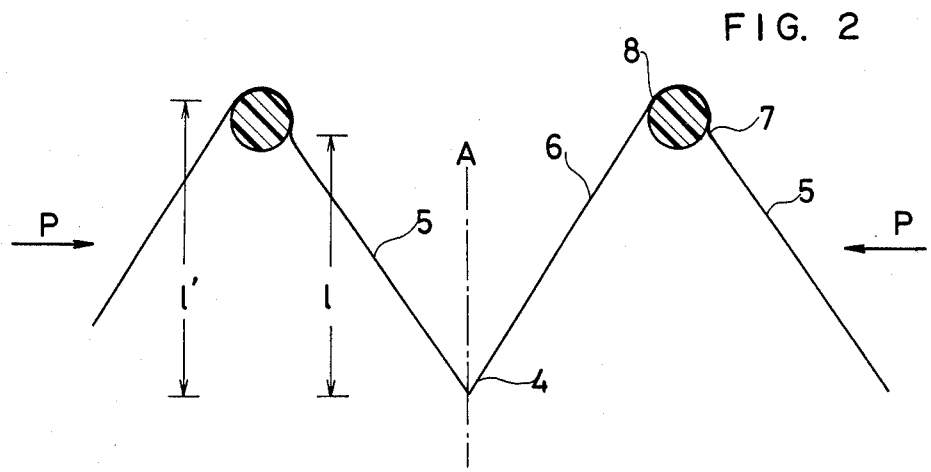
FIG. 2
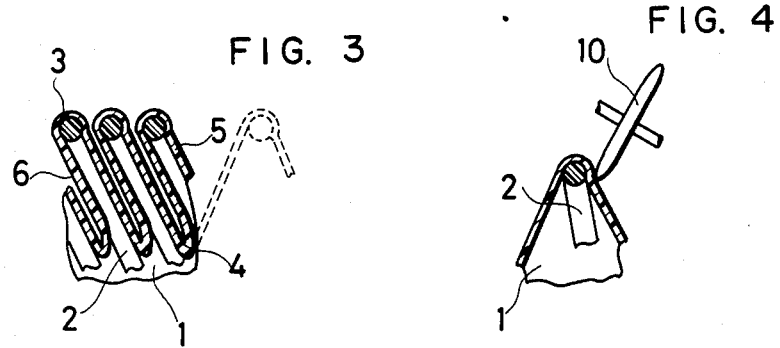
FIG. 3
FIG. 4

FOLDING HOSE

FIELD OF THE INVENTION

This invention relates to a flexible hose capable of keeping its length under conditions of expansion, contraction and variations therebetween, and of being kept as bent when the hose is bent.

DESCRIPTION OF THE PRIOR ART

Generally, this type of hose is called a folding hose. A single folding hose can have optional lengths and is able to be put away as contracted when out of use, thereby being useful as a suction hose for a cleaner or dust catcher. Such a hose is maintainable at bent angles optionally selected, thereby being useful as a blast hose for a hair dryer or usual drying machine.

Such a hose is also useful for the same purposes as a usual flexible hose, for example, as a dust-proof cover for an expansion joint of a machine tool hose, or as a bending drain hose used for a kitchen sink or wash stand.

Conventionally, three kinds of hoses have been disclosed as follows: Japanese patent publication No. Sho 43-23840 discloses a hose (a) which is smaller in thickness, does not provide any reinforcement, and is provided with folds extending at right angles to the direction of the length. One oblique side of each fold is made smaller than the other so that when the hose is put away the smaller oblique side is slanted elastically at the same angle of bend as the larger oblique side, thereby being kept in this condition. However, the hose (a), when its diameter is increased, becomes weak, and is unable to keep its form. Further, the elasticity of oblique side becomes poor.

Similarly to the above, Japanese patent publication No. Sho 45-14745 discloses a hose (b) whose oblique sides at each fold are made of equal length, in place of the unequal oblique sides of the hose (a). Also, one oblique side is made larger in thickness than the other so that when the hose is contracted the thin oblique side is positioned merely along the thick oblique side without having an elastic effect. The hose is thereby kept in this condition. The hose (b) however, is defective because it cannot be counted on to keep its form as its diameter becomes larger.

Both the hoses (a) and (b), which each have a wall of elastic material of synthetic resin, are not constant in length due to the condition of material.

Next, Japanese patent publication No. Sho 47-27164 discloses a hose (c) which has the ability to keep its formation. The hose is in the form of bellows type with a wall of synthetic resin, the wall being attached at the outer surface thereof with a reinforce coil, so that oblique sides of the bellows hose are curved. One of the curved oblique sides is made elastic to have the same effect as the aforesaid hose (a). In this case the hose is formed to curve at oblique sides after it is once molded so that there is a fear that the folding effect is lost once the hose is in use for a long time. Furthermore, there is a defect that warm air passing through the hose for a long time, removes the curved formation.

SUMMARY OF THE INVENTION

In view of the aforesaid problems, this invention has been designed. An object of the invention is the provision of a folding hose which eliminates the defects of conventional folding hoses, which has the ability to keep its formation regardless of its diameter, and which maintains the folding effect even when warm air flows through the hose.

Another object of the invention is to provide a folding hose of construction such that a molding process for making a conventional hose of bellows with a reinforce coil can be used without considerable change.

In order to achieve the aforesaid objects, the inventor has noticed that when expanding or contracting a bellows-type hose, the hose wall is bent at the shoulders on both sides of each chevron and at each valley apex, which concerns the stiffness of the hose wall. Hence, the modulus of elasticity in bending of synthetic resin constituting the hose wall of this invention is set in a range of 2.500 to 14.000 kg/cm$^2$ and a coil is attached at each chevron of hose wall, with one shoulder being attached to the coil at a side near the valley apex and the other at a side near the crest of the chevron, throughout the whole length.

The folding hose of this invention, when expanded, is kept stable because the form-keeping strength and stiffness, with respect to bending at the wall, allows the two oblique sides between the chevron and the valley apex to stretch. However, when the hose is subjected to an external force in the direction of contraction, the oblique side having the crest-side attachment gradually comes to have a larger angle of inclination than the oblique side having the valley-side attachment, and is therefore turned over elastically across the phantom perpendicular at the valley apex to thereby slant at an angle in the same direction as the oblique side having the valley-side valley attachment, thus contracting the hose. Under this condition, the two oblique sides still stretch to each other, thereby keeping the hose in contraction so long as no external force is applied to the hose. The hose, when bent, keeps the outer wall of hose in expansion as aforegoing and keeps the inner wall in contraction, whereby the hose, even when bent, is kept in the bent condition so long as no external force is applied to the hose.

BRIEF DESCRIPTION OF THE DRAWINGS

FIG. 1 is a partially cutaway side view of the hose of the invention, showing the basic construction thereof and a part of the hose wall in section, FIG. 2 is an enlarged schematic diagram of the hose wall for explanation of folding effect, FIG. 3 is a sectional view of the folded hose, FIG. 4 is a schematic view of a molding process for enlarging a range of adhesion of the wall to a coil.

PREFERRED EMBODIMENTS OF THE INVENTION

Figure 5:
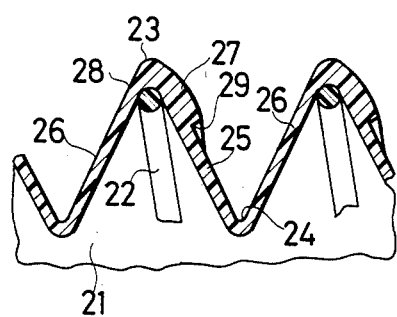
FIGS. 5 and 6 are sectional views of the hose in modified embodiments of the invention.

Embodiments of the invention will be detailed in the following description in accordance with the accompanying drawings.

In FIG. 1, a bellows type hose H is shown, in which a coil 2 is adhered to the inner surface of a hose wall 1, the adhesion therebetween constituting a chevron 3.

The hose wall 1 is made of synthetic resin of modulus of elasticity in bending in a range of 2.500 to 14.000 kg/cm$^2$, where in this embodiment a synthetic resin of mixture of polypropylene and ethylenepropylene copolymer, of bending stiffness rate of 5.100 kg/cm² is used.

The coil 2 is formed of a wire circular in section, the wire being made of hard synthetic resin stuck to the hose wall 1. The coil 2 may be made of a hard wire coated with a homogeneous synthetic resin.

At the chevron 3 an oblique side 5, at the right side with respect to the coil 2, is attached to the coil 2 over a larger area than an oblique side 6, at the left side smaller, which is attached thereto over a area. Hence, the shoulder 7, of the right oblique side 5, of the chevron 3 leaves the coil 2 at a position a nearer valley apex 4, while, the shoulder 8 of the left oblique side 6 leaves the coil 2 at a position thereof nearer the crest of chevron 3.

The hose H shown in FIG. 1 is kept in expansion by stretching both the right and left oblique sides 5 and 6.

Next, folding of the hose will be detailed according to FIG. 2.

A usual hose, when contracted, bends at both shoulders of the chevron, where the hose wall leaves the coil, and at the valley apex (if the hose wall is soft the oblique side happens to bend), which is well-known.

In this invention, both the shoulders 7, 8 and valley apex 4 serve as bending portions. When the hose H is subjected to a force in the direction of arrow P for contraction, height l from the valley apex 4 to the end of adhesion at the right side shoulder 7 and that l' from the valley apex 4 to the end of adhesion at the left shoulder 8, have the relation that $l < l'$. This allows the left shoulder 8 to start bending first at the fulcrum point of valley apex 4, thus gradually enlarging an angle of inclination at the left oblique side 6 to approach the phantom perpendicular A at the valley apex 4. When further applied with the force in the direction P, the left oblique side 6 is turned over elastically across the perpendicular A, so that the left and right oblique sides 6 and 5 are slanted in the same direction to thereby keep the hose H in contraction. When contracted, a major diameter D at the crest and a minor one d at the valley apex of the hose are constant and the left and right oblique sides 6 and 5 have stiffness against bending to stretch each other, whereby the contraction condition is kept as far as no force is applied reversely to the arrow P direction.

In addition, in order to lower the end of adhesion at the right shoulder 7 in comparison with the left shoulder 8, the hose, when molded, is applied at the right shoulder with a press roller 10 to enlarge an adhesion area of hose wall 1 to coil 2 as shown in FIG. 4.

In a modified embodiment in FIG. 5, the right and left shoulders 27 and 28 at opposite sides of chevron 23 are level at the ends of adhesion, but the right shoulder 27 is made larger in thickness than the left shoulder 28 throughout the whole length. Hence, the hose wall is bent at the end of thick portion 29.

Also, the hose wall bends at the end of adhesion to the coil 22 at the left shoulder 28 while the right oblique side 25 is bent lower than the left oblique side 26, thus obtaining the same functional effect as the hose shown in FIG. 1.

Figure 6:
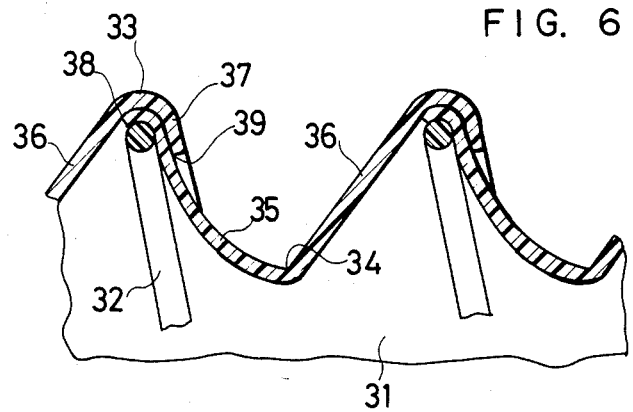

A further modified embodiment shown in FIG. 6 is combination of the hose in FIG. 1 with that in FIG. 5.

In the hose in FIG. 6 the right shoulder 37, at the chevron 33, is made larger in thickness throughout its length. The end of adhesion of a hose wall 31 to a coil 32 at the left shoulder 38 is positioned higher than the right shoulder 37. The bending portion of right oblique side 35 is the end 39 of the thick portion and that of left oblique side 36 is the end of adhesion to the coil 32. Hence, the bending portion of right oblique side 35 is positioned lower than that of left oblique side 36, thereby obtaining the same effect as the hose in FIG. 1.

Figure 7:
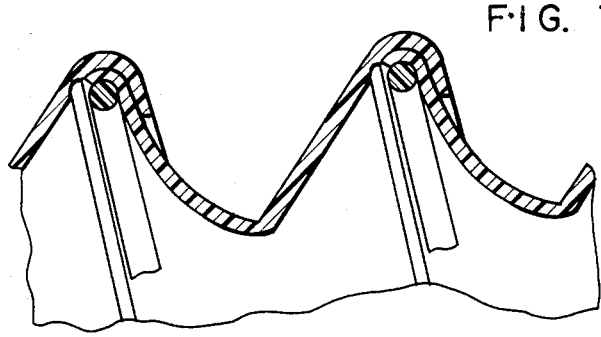
FIG. 7 is a sectional view of the hose in another modified embodiment, in which the upper bending portion and valley are made small in thickness.

A still further embodiment in FIG. 7 is so constituted that the higher bending portion is made slightly smaller in thickness than the hose wall at the oblique side so as to facilitate bending the left oblique side, whereby a further smaller force is capable of elastically turning the left oblique side. In addition, the higher bending portion and the valley may, not shown, be made smaller in thickness throughout the whole length. Availability for Industry As clearly understood from the aforesaid description, the folding hose of the invention allows selection of hose length corresponding to usage of a cooler or dust catcher regardless of the diameters of the same. Furthermore, the hose is available for channeling warm air or water through the hose, as it is bent, from a drying machine, or drain of a sink or wash stand. It is also available for joining portions where errors might easily appear in mounting distances.

I claim:

1. A folding hose of the bellows-type including: hose wall of synthetic resin attached to a coil to form, in longitudinal cross-section, a series of chevrons and V-shaped valleys, said folding hose being characterized in that the modulus of elasticity in bending of the synthetic resin constituting the hose wall is in a range of 2.500 to 14.000 kg/cm², wherein on one side of each chevron, when viewing the hose in cross-section, a first hose wall shoulder is attached to said coil at a position nearer an apex of the V-shaped valley and on the other side of said chevron a second hose wall shoulder is attached to the coil at a position nearer the crest of said chevron, with this condition existing substantially throughout the whole length of said hose, said V-shaped valley being characterized by having a distinct apex formed at the intersection of the first and second walls, said apex serving as as fulcrum.

2. A folding hose according to claim 1 wherein said hose wall forming said first shoulder of a chevron is made larger in thickness throughout the whole length of said hose.

3. A folding hose according to the claims 1 or 2 wherein the crest of said chevron is made greater in thickness throughout the whole length of said hose.

4. A folding hose as in claims 1 or 2 wherein the hose wall has a smaller thickness adjacent said second shoulder throughout the whole length of hose.

5. A folding hose of the bellows-type including a hose wall of synthetic resin attached to a coil to form, in longitudinal cross-section, a series of chevrons and V-shaped valleys, said folding hose being characterized in that the modulus of elasticity in bending of the synthetic resin constituting said hose wall is in a range of from 2.500 to 14.000 kg/cm², on one side of each chevron, when the hose is viewed in longitudinal cross-section, a first hose wall shoulder is of a greater thickness than a second hose wall shoulder on the other side of said chevron, and this condition exists substantially throughout the whole length of said hose, said V-shaped valley being characterized by having a distinct apex formed at the intersection of the first and second walls, said apex serving as a fulcrum.

* * * * *